(12) United States Patent
Crossley

(10) Patent No.: US 10,058,116 B2
(45) Date of Patent: Aug. 28, 2018

(54) INFANT FORMULA WITH IMPROVED NUTRITIONAL VALUE AND DIGESTIVE PROPERTIES

(71) Applicant: Cari Genea Crossley, Southfield, MI (US)

(72) Inventor: Cari Genea Crossley, Southfield, MI (US)

(*) Notice: Subject to any disclaimer, the term of this patent is extended or adjusted under 35 U.S.C. 154(b) by 226 days.

(21) Appl. No.: 14/987,439

(22) Filed: Jan. 4, 2016

(65) Prior Publication Data
US 2017/0188617 A1  Jul. 6, 2017

(51) Int. Cl.
A23L 2/00       (2006.01)
A23L 33/16      (2016.01)
A23L 33/00      (2016.01)
A23L 33/135     (2016.01)
A23L 33/125     (2016.01)
A23L 33/15      (2016.01)
A23L 33/12      (2016.01)
A23L 33/19      (2016.01)

(52) U.S. Cl.
CPC ........... *A23L 33/16* (2016.08); *A23L 33/12* (2016.08); *A23L 33/125* (2016.08); *A23L 33/135* (2016.08); *A23L 33/15* (2016.08); *A23L 33/19* (2016.08); *A23L 33/40* (2016.08)

(58) Field of Classification Search
USPC ............ 426/330.3, 580, 590, 490, 491, 617, 426/330.2
See application file for complete search history.

(56) References Cited

U.S. PATENT DOCUMENTS

| 5,709,888 A * | 1/1998 | Gil .................. A23C 11/04 424/522 |
| 6,034,130 A * | 3/2000 | Wang ................ A23C 11/04 424/420 |
| 2009/0123605 A1 * | 5/2009 | Van Benthum ...... A23C 9/1307 426/61 |
| 2014/0044830 A1 * | 2/2014 | Mace ................. A23L 1/296 426/2 |
| 2015/0079235 A1 * | 3/2015 | Wright ............... A23J 1/14 426/61 |
| 2016/0120207 A1 * | 5/2016 | Margossian ......... A23L 29/212 426/2 |

FOREIGN PATENT DOCUMENTS

WO   WO 2014/166789   * 10/2014

* cited by examiner

Primary Examiner — Nina Bhat
(74) Attorney, Agent, or Firm — Jason T. Newman

(57) ABSTRACT

A product for infant formula with improved nutritional value and digestive properties than currently available infant formulas, which is comprised of at least one of either powdered goat milk or pasteurized liquid goat milk; the powdered or liquid goat milk is diluted with water; a probiotic; a carbohydrate; Omega 3 vitamins; a mono-saturated fat; a natural source of iron, folic acid, B vitamins, and vitamin E; and, a natural source of lauric acid.

10 Claims, No Drawings

INFANT FORMULA WITH IMPROVED NUTRITIONAL VALUE AND DIGESTIVE PROPERTIES

TECHNICAL FIELD

The field to which the disclosure generally relates includes products and methods used to provide nutrition to infant humans as a substitute or supplement to a mother's breastmilk.

BACKGROUND

Certain infants are unable to receive nutrition directly from their mothers because their mothers are unwilling or unable to provide breastmilk. Certain infants are unable to receive complete nutrition directly from their mothers because their mothers are unwilling or unable to provide breastmilk in sufficient quantities. This lack of direct nutrition could have undesirable effect such as, among other things, malnutrition, loss of physical strength, illness, and in some cases death. Thus, it may be desirable to substitute or supplement a mother's breastmilk with infant formula.

SUMMARY OF EXEMPLARY EMBODIMENTS OF THE INVENTION

One exemplary embodiment may include a product which may include powdered goat milk or pasteurized liquid goat milk. The powdered or liquid goat milk may be diluted with water. The product may also contain a probiotic to improve digestive health. The product may also contain a carbohydrate, which serves as a nutrient. The product may contain Omega 3 vitamins. The product may contain a mono-saturated fat to balance blood cholesterol. The product may contain a natural source of iron, folic acid, B vitamins, and vitamin E. The product may contain a source of lauric acid.

DETAILED DESCRIPTION OF EXEMPLARY EMBODIMENTS

The following description of the embodiment(s) is merely exemplary (illustrative) in nature and is in no way intended to limit the invention, its application, or uses.

The product contains powdered goat milk (pasteurized and fortified in folic acid & Vitamin D). Powdered goat milk is used because it is most like human milk in that the fat molecules are smaller than cow milk, which makes it easier to digest. Cow milk has an "allergenic" protein called Alpha s1 casein. Goat milk has "non-allergenic" A2 beta-casein proteins, and less lactose. This ingredient is the base for protein, carbohydrates, fats, vitamins, and minerals). Liquid goat milk (pasteurized) can also be used in place of the powdered goat milk. The product contains between 1 and 2 tablespoons of powdered goat milk per 8 ounce serving size. If liquid goat milk is used, it is in a 1:1 ratio with at least one of either coconut or distilled water.

The product also contains goat milk Kefir, which serves as a probiotic that improves the digestive system, and boosts the good bacteria in the infant's body to fight bad bacteria. Probiotics are high in breast milk (colostrum). The product contains 1 tablespoons of Kefir per 8 ounce serving size.

The product also contains at least one of organic brown rice syrup or organic maple syrup grade B, which serves as a carbohydrate because the main nutrient in breast milk is the carbohydrates. This ingredient is necessary for brain growth in infants. The product contains between 2 and 3 tablespoons of at least one of organic brown rice syrup or organic maple syrup grade B per 8 ounce serving size.

The product also contains coconut water, which is used to dilute the goat milk base. The goat milk must be diluted as goat milk is higher in protein than cow's milk and breast milk. This ingredient serves as a natural source of lauric acid.

The product also contains distilled water, which is used to dilute the goat milk base. Again the goat milk must be diluted as goat milk is higher in protein than cow's milk and breast milk. The product contains 8 ounces of distilled water per 8 ounce serving size.

The product also contains Flaxseed Oil, which is a natural source of Docosahexaenoic acid ("DHA") and Omega 3 vitamins for healthy brain growth. The product contains between 1 and 1.5 teaspoons of Flaxseed Oil per 8 ounce serving size.

The product also contains extra virgin olive oil, which is a mono-saturated fat used to balances blood cholesterol. Extra virgin olive oil is preferred because it has more vitamin K than sunflower oil. The product contains between 1 and 1.5 teaspoons of extra virgin olive oil per 8 ounce serving size.

The product also contains sunflower Oil, which is a natural source of Vitamin E. Sunflower oil is also used because it contains more vitamin E than extra virgin olive oil. The product contains between 1 and 1.5 teaspoons of sunflower oil per 8 ounce serving size.

The product also contains coconut oil, which has important compounds such as lauric acid that is high in medium-chain fatty acids. The only other source that contains a high concentration of lauric acid is breast milk. Lauric acid helps destroy bacteria, viruses, and fungus in the infant's body. Coconut oil is also used to regulate blood sugar and thyroid function. Moreover, this is a vegan form of saturated fat, because most saturated fats are from animal proteins. Saturated fats are necessary for a healthy diet. Finally, the coconut oil is high in folic acid, which is found in breast milk. The product contains between 1 and 1.5 tablespoons of coconut oil per 8 ounce serving size.

The product also contains blackstrap molasses, which is high in vitamins and minerals (such as iron, folic acid). This helps to keeps the infant from getting constipated. The product contains between 1 and 1.5 teaspoons of blackstrap molasses per 8 ounce serving size.

The product also contains acerola powder (cherry powder), which is a natural source of Vitamin C, and fights infections. The product contains between 1 and 1.5 teaspoons of acerola powder per 8 ounce serving size.

The product also contains nutritional yeast, which is a natural source of folic acid and B vitamins. The product contains between 1 and 1.5 teaspoons of nutritional yeast per 8 ounce serving size.

The product also contains vitamin B Complex, which is a natural source of liquid B vitamins, such as B-12. The product contains 1 milliliter of vitamin B Complex per 8 ounce serving size.

The infant formula that is created has several "live" ingredients, and not "synthetic" ingredients. To illustrate the benefit of this infant formula, a good analogy would be to consider the infant formula as fresh foods. An adult can chose to consume fresh foods where the nutrients in the food are still alive versus consuming processed food where the nutrients in the food have no nutritional value because the nutrients are not alive. The additional ingredients added to process the food can be harmful. The additional ingredients are intended only to mimic the ingredients that are alive.

However, infants do not have a choice in the matter, if the infant's mother is unable or unwilling to provide complete direct nutrition from breastmilk. The current marketplace leaves very few options for substitute or supplemental infant formula.

As a result of the infant formula created many infants will suffer a significantly reduced number of illnesses, such as the common cold. Many infants will also have significantly reduced occurrences of "spitting up," which occurs when the infant's body rejects the formula, or the infant's body is trying to adjust to the formula. Additional benefits include increased alertness, greater physical strength compared to peers, and noticeably healthy hair and skin.

The above description of embodiments of the invention is merely exemplary in nature and, thus, variations thereof are not to be regarded as a departure from the spirit and scope of the invention.

What is claimed is:

1. An infant formula comprising:
   a. At least one of powdered goat milk and pasteurized liquid goat milk;
   b. coconut water;
   c. a probiotic;
   d. a carbohydrate;
   e. Omega 3 vitamins from flaxseed oil;
   f. a mono-saturated fat;
   g. a natural source of iron, folic acid, B vitamins, and vitamin E; and
   h. a natural source of lauric acid.

2. An infant formula as set forth in claim 1 wherein the probiotic is goat milk Kefir.

3. An infant formula as set forth in claim 1 wherein the carbohydrate is at least one of organic brown rice syrup or organic maple syrup grade B.

4. An infant formula as set forth in claim 1 wherein the mono-saturated fat is extra virgin olive oil.

5. An infant formula as set forth in claim 1 wherein the natural source of vitamin E is sunflower oil.

6. An infant formula as set forth in claim 1 wherein the natural source of iron and folic acid is blackstrap molasses.

7. An infant formula as set forth in claim 1 wherein the natural source of vitamin C is acerola powder.

8. An infant formula as set forth in claim 1 wherein the natural source of folic acid and B vitamins is Nutritional Yeast.

9. An infant formula as set forth in claim 1 wherein the natural source of B vitamins is Vitamin B Complex.

10. An infant formula as set forth in claim 1 wherein the natural source of lauric acid is coconut oil.

* * * * *